May 29, 1962

E. J. SAVILLE 3,036,593

PRESSURE RELIEF VALVE

Filed Aug. 10, 1959

Elric J. Saville,
INVENTOR

BY Boniard J. Brown
ATTORNEY

United States Patent Office 3,036,593
Patented May 29, 1962

3,036,593
PRESSURE RELIEF VALVE
Eric J. Saville, 742 W. Santa Barbara Drive,
Claremont, Calif.
Filed Aug. 10, 1959, Ser. No. 832,609
8 Claims. (Cl. 137—469)

This invention relates generally to valves; more particularly, it relates to improvements in pressure relief valves.

This application is a continuation-in-part of the application of Eric J. Saville, Serial No. 589,208 filed June 4, 1956 for "Relief Valve," now Patent Number 2,917,072.

The valve of the present invention relieves pressure to maintain a predetermined pressure intensity in a conduit or chamber. The valve opens and closes at predetermined pressure intensities, and it prevents pressure increase above predetermined pressure, within the limits of valve flow capacity. The valve initially opens at a predetermined pressure intensity and opens fully at a pressure level only slightly higher to carry full rate flow, thereby minimizing the differential between "cracking" pressure and full flow pressure.

In the device of the invention, a floating seat element and a cooperating poppet element are initially moved as a unit under increasing inlet pressure until a predetermined inlet pressure is attained. A seat element is urged against a poppet element with a seating or a sealing force proportional to increased inlet pressure until the valve "cracks" open. The seat and poppet elements are separated at a predetermined opening pressure by the arresting of seat element movement. The valve opens fully for full rated flow at a pressure intensity only slightly higher than the predetermined opening pressure intensity, thereby minimizing the differential between initial opening pressure intensity and full flow pressure intensity. A restricted flow passage is provided beyond a seal between the poppet and seat elements. The restricted passage prevents fluid expansion beyond the seal, thereby preventing cavitation and maintaining the fluid in a liquid state. The fluid therefore passes through orifices in the poppet element in a liquid state and exerts force urging the poppet element further from the seat element to permit increasing flow—the force being proportional to inlet pressure. The maintaining of the fluid in a liquid state and the prevention of cavitation insures liquid flow to cause a pressure drop across the orifices to produce increased opening force on the poppet element. Because cavitation is prevented, there is reduced energy loss across the seat opening.

It is therefore an object of the present invention to provide a relief valve which relieves pressure at a predetermined intensity and limits the pressure closely to the predetermined intensity.

An object of this invention is the provision of a pressure relief valve which opens at a selected pressure intensity and which opens fully for full rated flow at a pressure intensity only slightly higher, thereby minimizing the differential between the initial opening pressure intensity and the pressure at full rated flow.

It is an object of this invention to provide a relief valve wherein sealing force increases in proportion to increasing inlet pressure until the valve opens.

An object of the present invention is the provision of a relief valve wherein the opening force on a poppet element increases in proportion to inlet pressure after the valve opens.

It is an object of this invention to provide a relief valve (according to the foregoing object) wherein a seat member is urged against a poppet element with a seating force proportional to increasing inlet pressure.

An object of the present invention is the provision of a relief valve wherein a restricted flow passage beyond a seal prevents cavitation and expansion so that liquid flow produces increased opening force on a poppet valve.

Another object of this invention is the provision of a relief valve according to the foregoing objects wherein valve element fluctuation or chatter in response to inlet pressure fluctuation is minimized.

Other objects and features of the present invention, as well as many advantages thereof, will become apparent to those skilled in the art from a consideration of the following description, the appended claims and the accompanying drawings, wherein:

FIGURE 1 is a sectional view of a preferred embodiment of the relief valve of the present invention;

FIGURE 2 is a fragmentary sectional view showing a portion of the relief valve of FIGURE 1 on an enlarged scale;

FIGURE 3 is a view similar to that of FIGURE 2, showing elements in different operating positions; and FIGURE 4 is a transverse sectional view taken at line 4—4 of FIGURES 1 and 2.

Referring to the drawing, a preferred form of the relief valve assembly 10 is shown as including an elongated housing member 11 and a body member 12 threadedly secured together at 13. A threaded inlet opening 14 in the body member and a threaded outlet opening 15 in the end portion of the housing member receive appropriate couplings (not shown) which interconnect the valve with a fluid circuit.

A peripheral shoulder 16 of the body member 12 abuts the end of housing member 11. Body member 12 extends within the elongated housing member 11 and has an annular groove 20 defined therein for accommodating a resilient sealing ring 21 which provides pressure sealing between the housing member and the body member. A reduced end portion 22 of the body member threadedly engages an end cap 23 which secures lock ring 24 against the beveled end surface of end portion 22.

Body member 16 has axial bores 25, 26, a short smaller bore 27 and a threaded bore 28, all communicating with each other, as shown. A sleeve 30 is secured in bore 25 by engagement of a shoulder thereof with the cap member, and has its reduced end portion extending through an axial opening in end cap 23. A poppet element 33 is slidably mounted in sleeve 30 and has an end portion extending into engagement with a boss 34 on a spring retainer 35 which has a bore 44 for fluid communication. A helical compression spring 36 seats against retainer 35 and against a second spring retainer 37. An adjusting screw 38 for adjusting spring tension is threadedly mounted in a threaded opening 39 and has an axial opening 40 for fluid communication with outlet 15 of the valve.

The poppet element 33 has a large axial downstream opening 41 which communicates through a plurality of inclined passages 42 with a flow space 43 defined between the poppet element and the sleeve 30. A spacer 45 is fitted within the sleeve and is secured by engagement of its flange portion 46 between the end of the sleeve and an inclined surface 47 between bores 25 and 26, as shown. A reduced valve portion 48 of the poppet element and spacer 45 cooperate to define a restricted flow passage 49. A curved recess 50 is defined in the spacer. An enlarged axial opening 51 is provided in the reduced end portion 48 of the poppet element, for a purpose hereinafter described. A floating seat element 52 is slidable in the bore 26. An annular groove in the seat element accommodates a seal ring 54 which provides pressure sealing between bore 26 and the seat element. Seat element 52 is tubular in configuration and its axial opening is flared to provide a frustro-conical seat surface 55. Seat surface 55 is engageable with the upstream circular edge 56 of reduced valve portion 48 to provide a pressure seal, as indicated by the numeral 56. The surface 55 is preferably spherically lapped in the area of its circular line of contact with the edge of reduced valve portion 48. Axial movement of the seat element is limited by the upstream end surface of the spacer 45.

An axially extending post member 58 has a flange portion 59 secured against a shoulder 60 by an inlet nut 61 which is threadedly engaged in the bore 28 and which is provided with an enlarged axial opening, as shown. A plurality of openings in flange portion 59 permits free fluid flow. An enlarged head portion 63 of the post member extends into the enlarged recess 51 defined in the reduced valve portion 48, which cooperates with the poppet member to provide a dash pot for the purpose of preventing rapid fluctuating movement of the poppet element 33.

In the operation of the valve, inlet pressure acts through the inlet chamber 14 to exert force on the seat element 52 and on the reduced valve portion 48 of the poppet element. This force is balanced by the opposing action of spring 36 on the poppet element, which urges reduced valve portion 48 into engagement with the frustro-conical surface 55 of the seat element to provide the above-mentioned pressure seal at 56, as shown in FIGURE 1.

Referring to FIGURES 1 and 2, with the circular edge of the reduced valve portion 48 and the frustro-conical seat surface 55 in sealing engagement at 56, a portion of the downstream end surface area of the seat element is not exposed to the inlet pressure, and an unbalanced net area of the seat element is therefore exposed to the inlet pressure. Therefore, the seating or sealing force between the poppet and seat elements is proportional to the inlet pressure.

The opening pressure, the pressure to be relieved by the valve, is selected or predetermined by adjustment of the force of spring 47 by means of the adjusting nut 46, in a conventional manner.

When the inlet pressure approaches the predetermined opening or "cracking" pressure, which is sufficient to overbalance the force of spring 36 on the poppet element, the seat element 52 and the poppet element 33 are moved axially together as a unit. Upon the attaining of the predetermined opening pressure, the downstream end of the seat element contacts the upstream end of the spacer 45, which serves as stop means to prevent further axial movement of the seat element, as indicated in FIGURE 2. The inlet pressure then continues to urge the poppet element 33 rightward and separates the reduced poppet portion of the valve from the seat surface 55, thereby eliminating the seal at 56. Elimination of the pressure seal permits fluid flow through the restricted annular flow passage 49 between the valve portion 48 and the spacer 45.

The restricted flow passage 49 is an important feature of the present invention. The restricted passage is downstream of the seal and prevents expansion of the fluid from a liquid to a gaseous state by cavitation produced by high velocity. The fluid is thereby maintained in a liquid state and behaves hydrodynamically. This assures a pressure drop or differential across orifices 42 in the poppet element which produces substantial force to urge the poppet element further rightward to increase the opening between the reduced valve portion 48 of the poppet and the seat element 52. The prevention of cavitation results in reduced loss of energy across the opening at the seat element, in a manner well known in the art.

The maintenance of sufficient pressure by means of the restricted passage 49 avoids cavitation or vaporization downstream of the seal 56. Liquid flow is thereby maintained through the orifices 42 and produces a drag force tending to exert substantial opening force on the poppet element. This drag force urges the poppet element further rightward to increase the opening between the poppet and seat elements at seat 56 to allow increased flow therethrough to maintain the inlet pressure at the predetermined intensity.

The dash pot mechanism provided by the enlarged opening 51 in poppet member 58 and the head 63 of the post 58 serves to dampen movement of the poppet valve element and prevents fluctuating movement of the poppet element in response to inlet pressure fluctuations. Smooth, uniform non-chattering operation is thereby provided.

When the inlet pressure drops below the predetermined relief pressure, the spring 36 moves the poppet element leftward to re-engage the reduced valve portion 48 with the seat surface 55 of the seat element. Further decrease in pressure results in the spring urging the poppet element leftward with the seat element to the position shown in FIGURE 1.

From the foregoing, it will be appreciated that the relief valve of the present invention achieves the objects hereinbefore mentioned. The valve insures accurate relief of a predetermined pressure intensity to be controlled. The valve operates in a highly effective, efficient manner. The construction has an effective design and arrangement which provide for a minimum number of parts which are dependable, reliable and adapted for ease of fabrication, manufacture and assembly.

Although a specific embodiment of the present invention has been described and illustrated in detail, it is to be clearly understood that the same is by way of illustration and example only; it is to be understood that the invention is not to be limited thereto, as many variations will be readily apparent to those versed in the art and the invention is to be given its broadest possible interpretation within the scope of the appended claims:

The inventor claims:

1. A relief valve comprising housing means having an inlet chamber and an outlet chamber, a seat element, a coaxial poppet element, means mounting each of said elements for axial movement within the housing, the poppet element and the seat element being adapted for cooperation to provide a seal to prevent flow of fluid from the inlet chamber to the outlet chamber, and resilient means urging the poppet element against the force exerted by inlet pressure, stop means limiting the extent of said axial seat element movement, whereby increasing inlet pressure moves said elements axially as a unit against the urging of said resilient means and separates the elements to eliminate said seal by continuing to move the poppet element after movement of the seat element is arrested by said stop means, and means cooperating with said poppet element to define an elongated restricted flow passage downstream of said seal for maintaining the fluid in a liquid state, said poppet element having orifices downstream of the restricted passage to define predetermined communication between said restricted passage and said outlet chamber, whereby said increasing inlet pressure produces increasing force urging the poppet element against said predetermined force of the resilient means to increase the separation of said elements to provide full relief above a predetermined pressure.

2. A relief valve comprising housing means having an inlet chamber and an outlet chamber, a seat element, a coaxial poppet element, means mounting each of said elements for axial movement within the housing, the poppet element and the seat element being adapted for cooperation to provide a seal to prevent flow of fluid from the inlet chamber to the outlet chamber, the seat element having an unbalanced area exposed to inlet pressure while said seal is formed, and resilient means urging the poppet element against the force exerted by inlet pressure, stop means limiting the extent of said axial movement of the seat element, whereby increasing inlet pressure moves said elements axially as a unit against the urging of said resilient means and separates the elements to eliminate said seal by continuing to move the poppet element after movement of the seat element is arrested by the stop means, and means cooperating with said poppet element to define an elongated restricted flow passage downstream of said seal for maintaining the fluid in a liquid state, said poppet element having orifices downstream of the restricted passage to define predetermined communication between said restricted passage and said outlet chamber to produce a pressure drop across the orifices, whereby said increasing inlet pressure produces increasing force urging the poppet element against said predetermined force of the resilient means to increase the separation of said elements to provide full relief above a predetermined pressure.

3. A relief valve comprising housing means having an inlet chamber, an outlet chamber, and a bore therebetween, a seat element slidable in an upstream portion of the bore, a coaxial poppet element having a reduced upstream valve portion, said poppet element being slidable in a downstream portion of the bore, said poppet element end portion and the seat element being adapted for cooperation to provide a seal to prevent flow of fluid from the inlet chamber to the outlet chamber, the seat element having an unbalanced area exposed to inlet pressure while said seal is formed, and resilient means urging the poppet element with predetermined force against the force exerted by inlet pressure, and stop means limiting the extent of said axial movement of the seat element, whereby increasing inlet pressure moves said elements axially as a unit against the urging of said resilient means and separates the elements to eliminate said seal by continuing to move the poppet element after movement of the seat element is arrested by the stop means, and spacer means cooperating with said poppet element to define an elongated restricted flow passage downstream of said seal for maintaining the fluid in a liquid state, said poppet element having orifices downstream of the restricted passage to define predetermined communication between said restricted passage and said outlet chamber, whereby said increasing inlet pressure produces increasing force urging the poppet element against said predetermined force of the resilient means to increase the separation of said elements to provide full relief above a predetermined pressure.

4. A relief valve comprising housing means having an inlet chamber, an outlet chamber, and a bore therebetween, a seat element slidable in an upstream portion of the bore, a coaxial poppet element having a reduced upstream valve portion, said poppet element being slidable in a downstream portion of the bore, said poppet element end portion having an upstream edge for cooperation with an end surface of the seat element to provide a seal to prevent flow of fluid from the inlet chamber to the outlet chamber, the seat element having an area of said end surface radially outside said seal, whereby an unbalanced area of the seat element is exposed to inlet pressure while the seal is formed, thereby urging the seat element against the poppet element with a sealing force proportional to inlet pressure, and resilient means urging the poppet element with predetermined force against the force exerted by inlet pressure, stop means limiting the extent of said axial movement of the seat element, whereby increasing inlet pressure moves said elements axially as a unit against the urging of said resilient means and separates the elements to eliminate said seal by continuing to move the poppet element after movement of the seat element is arrested by the stop means, and means cooperating with said poppet element to define an elongated restricted flow passage downstream of said seal for maintaining the fluid in a liquid state, said poppet element having orifices downstream of the restricted passage to define predetermined communication between said restricted passage and said outlet chamber, whereby said increasing inlet pressure produces increasing force urging the poppet element against said predetermined force of the resilient means to increase the separation of said elements to provide full relief above a predetermined pressure.

5. A relief valve comprising housing means having an inlet chamber and an outlet chamber, a seat element, a coaxial poppet element, means mounting each of said elements for axial movement within the housing, the poppet element and the seat element being adapted for cooperation to provide a seal to prevent flow of fluid from the inlet chamber to the outlet chamber, the seat element having an unbalanced area exposed to inlet pressure while said seal is formed, and spring means urging the poppet element against the force exerted by inlet pressure, stop means limiting the extent of said axial movement of the seat element, whereby increasing inlet pressure moves said elements axially as a unit against the urging of said spring means and separates the elements to eliminate said seal by continuing to move the poppet element after movement of the seat element is arrested by the stop means, means for adjusting said spring means to exert selected force on the poppet element to predetermine the inlet pressure for eliminating said seal, and means cooperating with said poppet element to define an elongated restricted flow passage downstream of said seal for maintaining the fluid in a liquid state, said poppet element having orifices downstream of the restricted passage to define predetermined communication between said restricted passage and said outlet chamber to produce a pressure drop across the orifices, whereby said increasing inlet pressure produces increasing force urging the poppet element against said predetermined force of the resilient means to increase the separation of said elements to provide full relief above a predetermined pressure.

6. A relief valve comprising housing means having an inlet chamber, an outlet chamber, and a bore therebetween, a seat element slidable in an upstream portion of the bore, a coaxial poppet element having a reduced upstream valve portion, said poppet element being slidable in a downstream portion of the bore, said poppet element reduced valve portion having a circular edge on the upstream end thereof, the seat element having an inclined end surface area for engaging said edge to form a seal between the seat element and the poppet element to prevent fluid flow from the inlet chamber to the outlet chamber, the seat element having an area of said end surface radially outside said seal, whereby an unbalanced area of the seat element is exposed to inlet pressure while the seal is formed, thereby urging the seat element against the poppet element with a sealing force proportional to inlet pressure, and resilient means urging the poppet element with predetermined force against the force exerted by inlet pressure, stop means limiting the extent of said axial movement of the seat element, whereby increasing inlet pressure moves said elements axially as a unit against the urging of said resilient means and separates the elements to eliminate said seal by continuing to move the poppet element after movement of the seat element is arrested by the stop means, and means cooperating with said poppet element to define an elongated restricted flow passage downstream of said seal for maintaining the fluid in a liquid state, said poppet element having orifices downstream of the restricted passage to define predetermined communication between said restricted passage and said inlet chamber, whereby said increasing inlet pressure produces increasing force urging the poppet element against said predetermined force of the resilient means to increase the separation of said elements to provide full relief above a predetermined pressure.

7. A relief valve comprising housing means having an inlet chamber, an outlet chamber, and a bore therebetween, a seat element slidable in a upstream portion of the bore, a coaxial poppet element having a reduced upstream valve portion, said poppet element being slidable in a downstream portion of the bore, said poppet element end portion having an upstream edge for cooperation with an end surface of the seat element to provide a seal to prevent flow of fluid from the inlet chamber to the outlet chamber, the seat element having an area of said end surface radially outside said seal, whereby an unbalanced area of the seat element is exposed to inlet pressure while the seal is formed, thereby urging the seat element against the poppet element with a sealing force proportional to inlet pressure, and resilient means urging the poppet element with predetermined force against the force exerted by inlet pressure, stop means limiting the extent of said axial movement of the seat element, whereby increasing inlet pressure moves said elements axially as a unit against the urging of said resilient means and separates the elements to eliminate said seal by continuing to move the poppet element after movement of the seat element is arrested by the stop means, and means cooperating with the poppet element to define an elongated restricted flow passage and a flow chamber downstream of said seal, said restricted passage maintaining the fluid in a substantially liquid state, said poppet element having an enlarged downstream opening and a plurality of orifices therein communicating between said flow chamber and the opening, whereby said increasing inlet pressure produces increasing force urging the poppet element against said predetermined force of the resilient means to increase the separation of said elements to provide full relief above a predetermined pressure.

8. A relief valve comprising housing means having an inlet chamber, an outlet chamber, and a bore therebetween, a seat element slidable in an upstream portion of the bore, a coaxial poppet element having a reduced upstream valve portion, said poppet element being slidable in a downstream portion of the bore, said poppet element end portion and the seat element being adapted for cooperation to provide a seal to prevent flow of fluid from the inlet chamber to the outlet chamber, the seat element having an unbalanced area exposed to inlet pressure while said seal is formed, and resilient means urging the poppet element with predetermined force against the force exerted by inlet pressure, stop means limiting the extent of said axial movement of the seat element, whereby increasing inlet pressure moves said elements axially as a unit against the urging of said resilient means and separates the elements to eliminate said seal by continuing to move the poppet element after movement of the seat element is arrested by the stop means, spacer means cooperating with said poppet element to define an elongated restricted flow passage downstream of said seal for maintaining the fluid in a liquid state, said poppet element having orifices downstream of the restricted passage to define predetermined communication between said restricted passage and said outlet chamber, whereby said increasing inlet pressure produces increasing force urging the poppet element against said predetermined force of the resilient means to increase the separation of said elements to provide full relief above a predetermined pressure, and stationary head means cooperating with a recess in said reduced valve portion of the poppet element to provide a dash pot to prevent rapid fluctuations in poppet element movement.

References Cited in the file of this patent

UNITED STATES PATENTS

| | | |
|---|---|---|
| 2,287,840 | Stratton | June 30, 1942 |
| 2,292,294 | Rotter et al. | Aug. 4, 1942 |
| 2,591,528 | Filstrup | Apr. 1, 1952 |
| 2,622,613 | McNeal | Dec. 23, 1952 |
| 2,917,072 | Saville | Dec. 15, 1959 |

FOREIGN PATENTS

| | | |
|---|---|---|
| 544,524 | Great Britain | Apr. 16, 1942 |
| 659,078 | Great Britain | Oct. 17, 1951 |